Patented Oct. 26, 1943

2,332,555

UNITED STATES PATENT OFFICE 2,332,555

PROCESS FOR PRODUCING TERTIARY ALKYL PHENOLS

Hyym E. Buc, Roselle, N. J., assignor to Standard Oil Development Company, a corporation of Delaware No Drawing. Application May 9, 1940, Serial No. 334,218

7 Claims. (Cl. 260—624)

This invention relates to an improved process for the preparation of tertiary alkyl phenols by the condensation of tertiary olefins with phenols. By tertiary alkyl phenols are meant phenolic compounds containing an alkyl group in which the carbon atom connected to the aromatic nucleus is connected to three other carbon atoms of the alkyl group. Tertiary olefins are those in which a carbon atom is connected through an olefinic double bond to another carbon atom and through single bonds to two other carbon atoms.

It is already known that tertiary alkyl phenols can be formed by condensing tertiary olefins with phenols in the presence of catalysts such as sulfuric acid, aluminum chloride and the like. Such catalysts, however, are so active that they readily cause secondary reactions involving the highly active tertiary olefins. The use of such catalysts either involves low temperatures requiring refrigeration or results in low yields, such catalysts being often found subject to both these objections. The action of these catalysts is particularly objectionable when using relatively high molecular weight tertiary olefins of more than 6 carbon atoms per molecule.

It has now been found that the tertiary olefins may be condensed with phenols to form tertiary alkyl phenols in substantially theoretical yields by the use of a stannic chloride catalyst, and the reaction may be conducted entirely at room temperature (20° C.) or at even somewhat higher temperatures. It is believed that this catalyst is unique in its ability to catalyze the desired formation of tertiary alkyl phenols without at the same time causing objectionable side reactions among the tertiary olefins used.

This invention is illustrated by the following example:

One mol of phenol is mixed with one mol of di-isobutylene. One percent of stannic chloride (tin tetrachloride) is dissolved in this mixture and a small amount of hydrogen chloride is then passed into the mixture with stirring. As the reaction proceeds, the mixture is allowed to warm up to about 60-70° C. and is thereafter maintained in this range by indirect heat exchange with cooling water. The stirring is continued until the reaction is largely complete, as indicated by a reduction in the rate of heat evolution; the reaction mixture is then allowed to stand at room temperature for approximately 12 hours. There is thus obtained a substantially theoretical yield of tetramethyl butyl phenol of such high purity that it is necessary only to remove the catalyst to render it suitable for most purposes. This may be done by any suitable method, those involving hydrolysis being preferred. For example, the total reaction mixture may be dissolved in chloroform and the chloroform solution washed with a 15-20% aqueous hydrochloric acid solution and then with water until substantially halide-free, and then dried. The chloroform is then removed by distillation and tetra-methyl-butyl phenol is obtained as the residue, which is in the form of white crystals and which has a melting point of 84° C. The pure, recrystallized product has a melting point of 86° C.

When conducting the process under the same conditions as described above except that sulfuric acid or aluminum chloride is used as the catalyst, the resulting product is greatly contaminated with impurities and the yield of the tetramethyl-butyl phenol is much poorer. These catalysts also cause marked degradation of the reagents or products, much tertiary butyl phenol being obtained.

It will be apparent from the above example that a special advantage of the stannic chloride is that it is readily soluble in the reaction mixture and thereby provides uniform catalytic action throughout all portions of the mixture. The reaction is readily carried to completion with this catalyst; this permits the use of the olefin and phenol in stoichiometric quantities and greatly simplifies the recovery of the desired alkyl phenol, it being unnecessary to separate any excess or unreacted portion of either one of the reactants from the reaction product. The activity of the catalyst is promoted by passing a small amount of a dry hydrogen halide, preferably hydrogen chloride, into the reaction mixture. This greatly accelerates the rate of the reaction. Very small amounts of such promoters have been found effective for this purpose, from about 2 or 3% to 10% (molal basis) or more of them, based on the stannic chloride, being suitable.

While the invention has been illustrated above particularly in regard to the condensation of an isobutylene polymer with phenol, this process may also be used to condense other tertiary olefins, substituted or unsubstituted, with phenolic compounds containing at least one replaceable nuclear hydrogen. Suitable tertiary olefins include particularly the tertiary olefins of more than 6 carbon atoms and up to 20 carbon atoms or more, the preferred olefins being those in this range of molecular weight which are polymers of lower molecular weight tertiary olefins, such as di-tertiary-amylene, triisobutylene, tetraisobutylene and the like. These polymers may be prepared, for example, by treatment of isobutylene or tertiary amylene with polymerization catalysts, preferably those which cause formation of polymers consisting largely of dimers or trimers, such as active clay, stannic chloride, and the like. Suitable phenolic compounds include hydroxy aromatic compounds such as phenol, cresol, resorcinol, hydroquinone, pyrogallol, naphthol and the like. These also include derivatives of such hydroxy aromatic compounds having at least one replaceable nuclear hydrogen in the ortho or para position, such as chlor phenols, phenol sulfides, alkyl phenol thioether, and the like.

The process of this invention may also be conducted in the presence of suitable diluents such as carbon tetrachloride, ethylene chloride and the like. In case the diluent boils at about the desired maximum reaction temperature, the temperature of the reaction can readily be controlled by operation under a reflux condenser, the heat of reaction being taken up by the vaporized solvent which is condensed and returned to the reaction vessel. It is generally preferred to conduct the process with a maximum reaction temperature between about 50 and 85° C.

The reagents and diluents should be substantially anhydrous, as any water present causes hydrolysis of the stannic chloride. The use of very small amounts of catalyst, of the order of ½% to 2%, will be sufficient under such conditions, but larger amounts of catalyst may be used, and will be necessary if any substantial amount of water is present.

The numerous examples of this invention have been presented herein solely for purpose of illustration and the invention is not intended to be limited thereby as numerous variations in operating conditions will be apparent within the scope of the appended claims.

I claim:

1. An improved process for the preparation of a tertiary alkyl phenol having at least 6 carbon atoms in the alkyl group from a tertiary olefin and a phenol in the liquid phase at temperatures between 20° and 85° C. comprising bringing together a tertiary aliphatic olefin having at least 6 carbon atoms in the molecule and a phenol under said conditions in the presence of a dissolved stannic chloride catalyst and substantially anhydrous hydrogen chloride.

2. An improved process for the preparation of a tertiary alkyl phenol having at least 6 carbon atoms in the alkyl group from a tertiary olefin and a phenol in the liquid phase at temperatures between 20° and 85° C. comprising bringing together a tertiary aliphatic olefin having at least 6 carbon atoms in the molecule and a phenol under said conditions in the presence of a small amount of a dissolved stannic chloride catalyst and about 2 to 10% of substantially anhydrous hydrogen chloride (molal basis, on the stannic chloride).

3. Improved process for the preparation of a tertiary alkyl phenol having at least 6 carbon atoms in the alkyl group from a tertiary olefin and a phenol in the liquid phase at temperatures between 20 and 85° C., comprising bringing together a tertiary aliphatic olefin having at least 6 carbon atoms in the molecule and a phenol under said conditions in the presence of a dissolved stannic chloride catalyst and a small amount of an anhydrous hydrogen halide promoter therefor.

4. Improved process for the preparation of a tertiary alkyl phenol from a phenol and an olefinic polymer of a tertiary olefin in the liquid phase at temperatures between 20 and 85° C., comprising bringing together the said phenol and tertiary olefin polymer under said conditions in the presence of a dissolved stannic chloride catalyst and a small amount of a substantially anhydrous hydrogen halide promoter therefor.

5. Process according to claim 4 in which said tertiary olefin is diisobutylene.

6. Process according to claim 4 in which said tertiary olefin is triisobutylene.

7. Process according to claim 4 in which said tertiary olefin is ditertiary amylene.

HYYM E. BUC.